Jan. 3, 1928.
J. A. McKAY
CONNECTER
Filed June 20, 1924
1,654,660
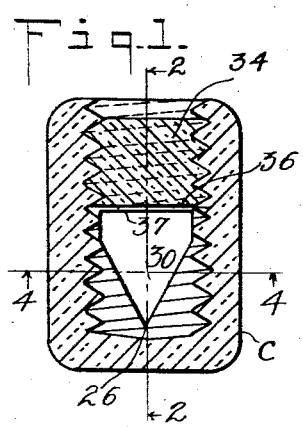
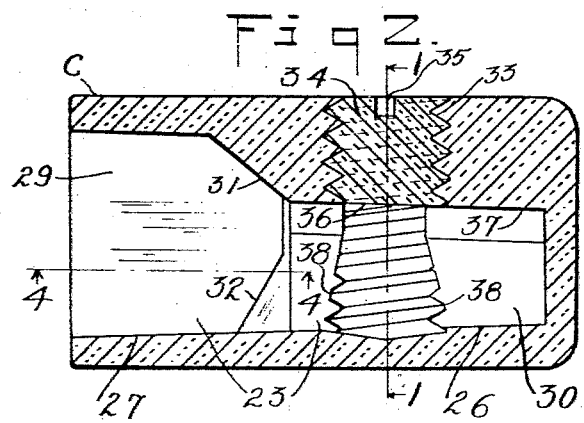
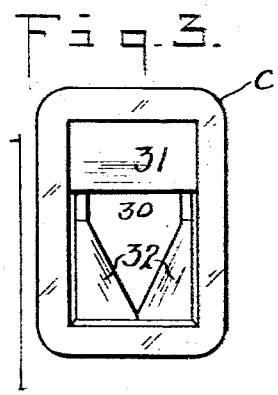
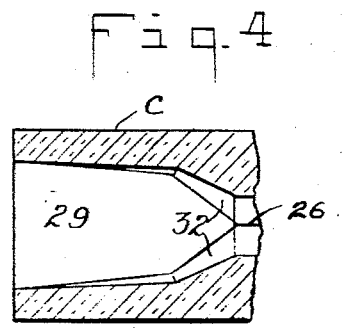
INVENTOR
JOHN ANDREW McKAY.
BY
Jules B Lieberman
ATTORNEY Patented Jan. 3, 1928.

1,654,660

UNITED STATES PATENT OFFICE.

JOHN ANDREW McKAY, OF TORONTO, ONTARIO, CANADA.

CONNECTER.

Application filed June 20, 1924. Serial No. 721,168.

The present invention relates to connecters and methods of making the same, and is more particularly directed toward a form of connecter suitable for joining relatively small wires such as are used in lighting fixtures, automobile wiring, and similar locations. While the invention is particularly adapted for use in such situations, it is, however, not limited to the same, for it is useful for joining larger wires.

In the wiring up of electric fixtures it is necessary to join pairs of wires in a permanent manner and to insulate the joint. It is ordinarily done by soldering the bare wires together and then taping the joint. This consumes considerable time and results in a joint which is difficult to inspect or repair.

Objects of the present invention are the provision of an improved connecter by which these pairs of wires may be joined and the joint insulated, also an improved method of making such connecters. The invention further contemplates the provision of a connecter which may be readily attached to the wires so as to remain permanently in position, or which may be easily removed for purposes of inspection, without rendering it difficult to reconnect the wires.

Another object of the invention is to provide a connecter in which the wires to be joined are forced into a V-shaped space and contorted or bound by means of a screw which clamps them in place. Other and further objects will appear as the description proceeds.

In the accompanying drawings, there is shown for purposes of illustrating the invention, one of the many possible embodiments in which it may take form, together with a method of making the connecter, it being understood that the drawings are for the purpose of illustrating the invention rather than limiting the same.

In these drawings:

Fig. 1 is a transverse cross section of one form of the connecter taken on the line 1—1 of Fig. 2, looking in the direction of the arrows;

Fig. 2 is a longitudinal section taken on the line 2—2 of Fig. 1, looking in the direction of the arrows;

Fig. 3 is an end view taken from the left of the connecter as shown in Fig. 2; and Fig. 4 is a section taken on the line 4—4 of Figs. 1 and 2, looking in the direction of the arrows.

The connecter C is shown in detail in Figures 1 to 4 inclusive. This connecter consists of a body of insulating material having a socket indicated in general at 23 opened at one end and closed at the other. This socket is rectangular in cross-section and comparatively large at the open end 29 and is smaller at the closed end 30 where it is of wedge shape or triangular cross-section. The side walls of the longitudinal hole are tapered intermediate the large and small ends as shown at 31 and 32, so that wires may be easily passed from the open end of the connecter down into the wedge shaped channel at the closed end.

The socketed piece of insulation is drilled laterally with a drilling passing from the upper side of the connecter as shown in Fig. 1 and 2 down to the lower edge 26 of the wedge shaped opening. The diameter of the drilling is approximately the same as the width of the upper part of the wedge shaped hole. The drilling is tapped to provide the threads 33 which extend all the way to the bottom of the drilling. It will be noted that a portion of the threads have been lost on account of the wedge shaped hole. There are, however, sufficient threads to connect those at the lower end of the hole with those in the upper thick wall of the connecter so that a screw may be threaded all the way down to the bottom of the longitudinal wedge shaped hole.

It will now be seen that the side walls of the inner end of the socket are synclinally arranged on opposite sides of the axis of the threaded opening. Also the portions 32 are synclinally arranged and tapered toward the back or inner end to merge into the synclinal inner walls.

A headless screw 34, preferably made of insulating material and provided with a saw-cut 35, is threaded into the tapped hole 33; the length of this screw is preferably such that it will not project beyond the outer surface of the connecter when it has been removed to bring its lower edge 36 opposite the upper side 37 of the wedge shaped hole. An insulating screw is preferred for it affords complete insulation of the connecter. The screw is headless so that one may thread it in to the bottom of the tapped hole, thereby reaching any sized wire, In joining a plurality of wires, such as fixture wires, by the device above described it is merely necessary to remove the insulation from the ends of the wires, twist them together and place the cap over the free end of the twisted wires. When the screw 34 is backed out there is plenty of room for inserting the wires into the upper wide part of the wedge shaped opening or cavity, the adjacent insulation being accommodated by the comparatively large chamber or opening 29 at the open end of the cap. One may then complete the clamping of the wires by threading the screw in, thereby forcing the wires into the narrow portion of the V or wedge. During this operation the wires are clamped very tightly and are brought close together, especially by being wedged into the narrow space formed by the walls which are at a dihedral angle to one another, and bent over the ridges 38 which appear at the intersection of these walls and the lower portion of the threaded screw hole. When it is desired to inspect the joint it is only necessary to release the screw and remove the cap and screw from the twisted pairs, whereupon the joint may be inspected and the cap returned and clamped in place. It is, of course, obvious that the invention is suitable for use with solid conductors as well as with twisted or braided conductors. One may, if desired, seal in the screw with the usual wax.

It is obvious that the invention may be embodied in many forms and constructions, it being understood that the particular form shown is only one of the many forms. Various modifications and changes being possible, I do not limit myself in any way with respect thereto.

I claim:

1. An electric connecter comprising a block of insulating material having a wire receiving socket open at one end and closed at the other, said block further having a threaded opening extending from the top of the block into the inner end of said socket, the inner end of the socket having lateral walls on opposite sides of the threaded opening and synclinally disposed with relation to the axis of said threaded opening, the outer end of the socket being of rectangular form and having the lower rear portions of its lateral walls synclinally arranged and tapered inwardly to meet the forward edges of the synclinal walls of the inner end, said outer end further having the rear portion of its top wall inclined downwardly to meet the top wall of its inner end, and a screw extending through the threaded opening and having its inner end of insulated material adapted to engage and grip wires positioned in the inner end of the socket.

2. An electric connecter including a block of insulating material having a wire receiving socket open at one end and closed at the other, said block further having a threaded opening extending from the top of the block into the inner end of said socket, the inner end of the socket having lateral walls on opposite sides of the threaded opening and synclinally disposed with relation to the axis of the threaded opening, the outer end of the socket being of rectangular form and having the lower rear portions of its lateral walls synclinally arranged and tapered inwardly to meet the forward edges of the synclinal walls of the inner end, and a screw extending through the threaded opening adapted to engage and grip wires positioned in the inner end of the socket.

3. An electric connecter comprising a block of insulating material having a wire receiving socket open at one end and closed at the other, said block further having a threaded opening extending from the top of the block into the inner end of said socket, the inner end of the socket having lateral walls on opposite sides of the threaded opening and synclinally disposed with relation to the axis of said threaded opening, the outer end of the socket being of rectangular form at its mouth and having its walls at the rear inclined to merge into the inner end of the socket, and a screw extending through the threaded opening adapted to engage and grip wires positioned in the inner end of the socket.

Signed at New York city, in the county of New York and State of New York, this 13th day of June, 1924.

JOHN ANDREW McKAY.